United States Patent [19]
Einolf, Jr. et al.

[11] 3,919,533
[45] Nov. 11, 1975

[54] ELECTRICAL FAULT INDICATOR

[75] Inventors: Charles W. Einolf, Jr., Export; James A. Neuner, Gibsonia, both of Pa.

[73] Assignee: Westinghouse Electric Corporation, Pittsburgh, Pa.

[22] Filed: Nov. 8, 1974

[21] Appl. No.: 522,191

[52] U.S. Cl. .................... 235/153 AC; 340/146.1 E
[51] Int. Cl.[2] ...................... H04B 3/46; G06F 11/04
[58] Field of Search .. 235/153 AC, 153 A, 153 AK; 340/146.1 E, 172.5

[56] References Cited

UNITED STATES PATENTS

| | | | |
|---|---|---|---|
| 3,500,318 | 3/1970 | Arlen | 340/146.1 E |
| 3,745,529 | 7/1973 | Engle | 340/146.1 E |

*Primary Examiner*—R. Stephen Dildine, Jr.
*Attorney, Agent, or Firm*—D. C. Abeles

[57] ABSTRACT

A method and apparatus for indicating a malfunction in the normal operation and operating components of electrical apparatus. A predetermined coded output is generated periodically in response to the proper operation of the apparatus being monitored. The coded output is conveyed to a decoder network which deciphers the input signal and provides a symbolic output for identifying the reception of the coded output. A timer operable to sequence through a predetermined time interval generates an output during the interval which is reinitiated in response to the symbolic output of the decoder network. In addition, means are provided for supplying a fault output, which is inhibited during the interval of the timer output. The timer interval is desirably selected to be greater than the interval between generation of the coded output so that a fault output is inhibited so long as the apparatus is properly operating. If for any reason, the decoder network fails to identify the reception of the coded output within the timer interval a fault output signal is conveyed representative of a malfunction in the monitored apparatus.

The invention is ideally applicable to digital processing and information transmission systems wherein the coded output is preferably designed to exercise all states of the data and address lines of the communication busses.

14 Claims, 12 Drawing Figures

78

ELECTRICAL FAULT INDICATOR

BACKGROUND OF THE INVENTION

This invention pertains generally to electrical monitoring systems and more particularly to fault indicating systems that are responsive to the absence of a monitoring signal.

In many applications utilizing electrical or mechanical apparatus, electrical monitoring systems are employed to continuously survey the operation of the apparatus and annunciate malfunctions which could otherwise adversely affect the application in which the apparatus is being employed unless immediate corrective action is taken. Monitoring techniques are particularly important in many industrial applications in which minicomputers have been introduced for the purpose of collecting data, processing data, and providing control and data outputs. It is possible and probable that failures will occur within the processor, its memory, or its interface system. Many of these failures are likely to go undetected, depending upon the systems configuration, unless properly annunciated. Such failures could well result in incorrect actions leading to costly consequences.

While a number of monitoring and annunciating systems are presently available in the art, the majority of such systems depend upon a positive output engendered by the malfunction to initiate an annunciator to alert system personnel to the operating fault. Generally, such fault indication circuits remain inactive during the proper operation of the monitored apparatus. Accordingly, a fault in the monitoring circuits will not normally be detected and will defeat the purpose of the system.

These problems become even more acute in digital communication systems where not only the processing electronics have to be monitored, but some assurance has to be given that the communication data lines are operating with the versatility required.

Accordingly, an improved fault indicating system is desired which will be responsive to not only malfunctions within the apparatus of concern, but in addition, to malfunctions within the monitoring instrumentation as well. Additionally, a fault indication system is desired that is capable of surveying the full versatility of the apparatus of interest.

SUMMARY OF THE INVENTION

Briefly, this invention provides an improved method and apparatus for indicating faults in the operation of apparatus continuously monitored. In accordance with the invention a predetermined coded output signal is periodically generated when the apparatus monitored is functioning properly. The coded output is supplied to a decoder network which generates a symbolic output representative of the reception of the coded signal. A timing network is designed to supply an electrical output for a predetermined time interval, which is reinitiated in response to the decoder symbolic output signal. A fault output is continuously active and is inhibited from being communicated during the active interval of the timing output. Accordingly, a fault output is communicated at the termination of the timing interval in the absence of a reinitiating signal engendered by the reception of the coded output.

Desirably, in the preferred embodiment, the coded output is periodically supplied to the decoder network in a cyclic interval having a period shorter than the predetermined time interval of the timing network so that the fault output is continuously inhibited as long as the coded output is continuously supplied with the desired periodicity.

The fault indicating system of this invention has particular benefit in an application to digital processing and communication systems where it is designed to exercise the full capabilities of the data control and address transmission lines. Preferably, in this type of application, the coded output is selected to include a predetermined sequence of complementary addresses and data words that will assure the proper operation of not only the digital processing systems, but in addition, the full capability of the communications systems as well.

BRIEF DESCRIPTION OF THE DRAWINGS

For a better understanding of the invention, reference may be had to the preferred embodiment, exemplary of the invention, shown in the accompanying drawings, in which.

DESCRIPTION OF THE PREFERRED EMBODIMENT

This invention provides a fault indicator for continually monitoring the operation of electrical apparatus. The invention is particularly applicable to communication systems such as the one illustrated in FIG. 1 and provides additional benefit in digital communication arrangements.

Figure 1:
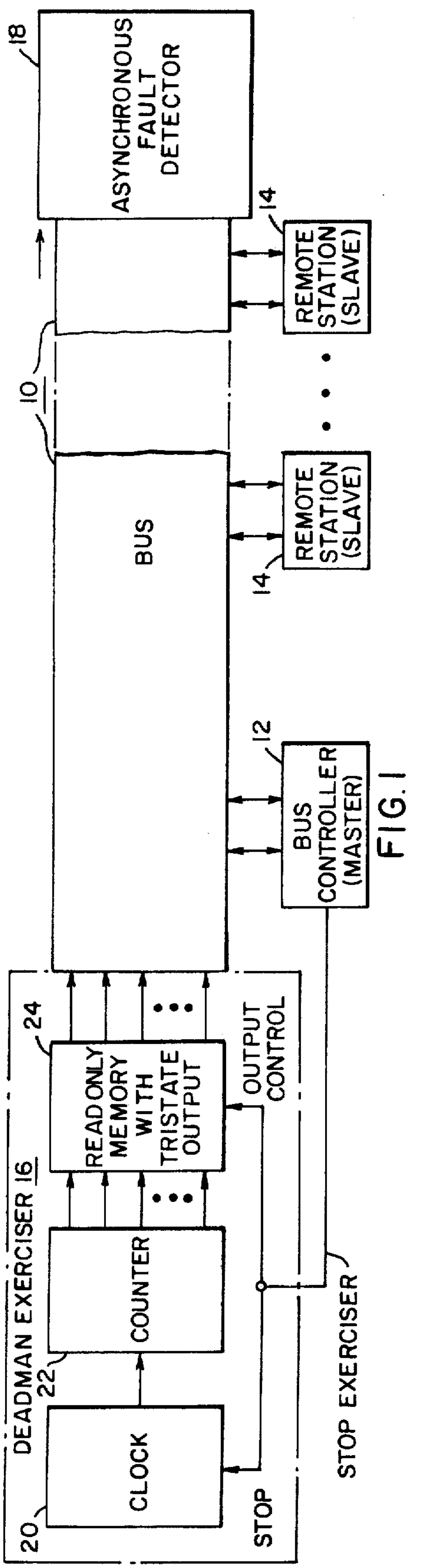
FIG. 1 is a schematic illustration of the application of this invention in a basic communication system.

Referring to FIG. 1 it will be appreciated that a communication bus 10 is provided generally including a number of address, control and data word lines for transporting coded information in electrical digital form between different locations. The bus controller 12, commonly referred to as the master, controls the dissemination and retrieval of information, on the bus line 10, to and from the remote locations 14, which are commonly referred to as the slaves. As is commonly known in the art, the remote locations 14 identify the digital information intended for their respective locations by decoding corresponding assigned addresses. The actual information conveyed is coded in the form of digital data words. Accordingly, the bus 10 generally includes separate address, control and data word lines. In accordance with this invention the bus controller 12 is assigned an additional task of periodically activating a deadman exerciser 16 which functions to communicate a given set of addresses and data words to an asynchronous deadman circuit 18 to be described in more detail hereinafter. Thus, the bus controller periodically activates the deadman exerciser which generates a preselected arrangement of coded digital outputs which are transported to the asynchronous deadman 18 via the bus 10.

Desirably, the outputs transmitted by the deadman exerciser include a sequence of complementary addresses, which totally occupy the assigned address lines and a corresponding sequence of complementary data words which completely occupy the assigned data lines of the bus.

An activating signal from the bus controller 12 initiates the running of the clock 20 which in turn provides a corresponding output to sequence the counter 22 through a given number of states representative of the desired preselected addresses and data words. The counter provides a cyclic output which is used to select the predetermined address and data words stored in the read only memory, which stores the information until the bus controller 12, through an appropriate output command, directs the read only memory 24 to communicate the desired output sequence to the asynchronous deadman 18 via the bus 10. The read only memory, in this exemplary arrangement, is responsive to the bus controller's command to distribute complementary addresses and corresponding complementary data words according to the preselected sequence.

Reception of the properly coded information in the desired sequence is identified by a decoding network within the asynchronous deadman 18. The output of the decoding network reinitiates a timing interval which has a corresponding electrical output having a duration equal to that of the timing interval. The output of the timer is employed to inhibit an active fault output from being communicated to appropriate malfunction annunciators which can be arranged to take the corrective form of action desired. Preferably, the output of the read only memory is communicated with a periodicity sufficient to continuously run the timer output so that a malfunction is only identified under circumstances where the bus controller fails to cycle through its intended operation. Alternately, the periodicity of the read only memory output can be slightly greater than the timing interval within the asynchronous deadman 18 to render the annunciators active for a short duration to assure their operability. The read only memory is an element readily available in the art having three output states, two of which correspond to the complementary states of the address and data words. The third state is a floating output which is utilized during normal operation of the bus controller 12 to accommodate transmission and reception of the information normally conveyed and received between the bus controller and the remote stations 14. Similarly, the clock 20 and counter 22 are commonly available in the art as off-the-shelf items.

In many industrial systems, minicomputers have been introduced for the purpose of collecting data, processing data, and providing control and data outputs. It is possible, and even probable, that failures will occur within the processor, its memory, or its interface systems. Many of these failures are likely to go undetected depending upon the system's configuration. Such failures could well result in incorrect actions leading to costly consequences. Accordingly, the fault indicator of this invention can provide particular benefit to minicomputer applications and will be described hereinafter as exemplarily applied to one such system for identifying malfunctions in the input/output bus as well as the processor itself.

Figure 2:
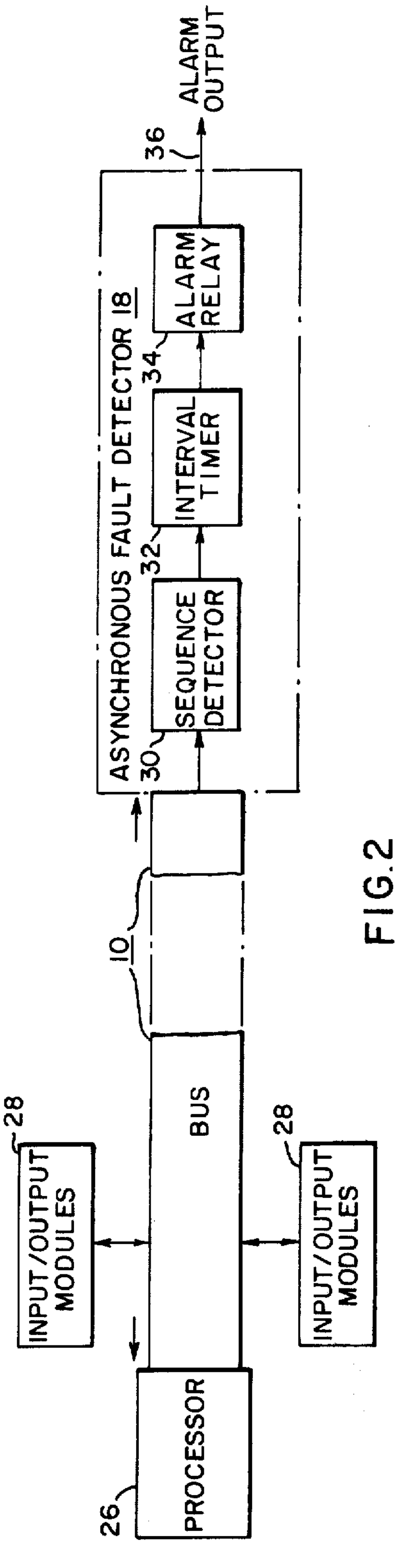
FIG. 2 is a schematic illustration of the application of this invention to a digital processor including a block diagram of the basic fault indicator system of this invention.

FIG. 2 illustrates an exemplary application to a minicomputer system having a processor 26, input/output bus 10 and input/output modules 28. The similarities between the system illustrated in FIG. 2 and that illustrated in FIG. 1 are readily apparent, in that the processor 26, as will be appreciated by those skilled in the art, assumes the responsibility for both the bus controller 12 and the deadman exerciser 16. The input/output bus 10 is essentially identical to the bus illustrated in FIG. 1 and the input/output modules 28 correspond to the remote stations 14. The asynchronous fault detector 18 is shown in greater detail to include the sequence detector 30 which corresponds to the decoding network previously described in FIG. 1. The output of sequence detector 30 is communicated to the interval timer 32 which is responsive thereto to reinitiate the predetermined time interval. The timer output is communicated to the alarm relay 34 to deactivate the alarm output 36 as long as the timer interval has not expired.

As will be appreciated from the more detailed description of the operation of the processor to be set forth hereinafter, the processor during its normal sequence of operation in communication with the input/output modules, periodically communicates a predetermined coded output to the asynchronous fault detector 18. The sequence detector will check the validity and sequence of the received signals and if the coded output is received in proper sequence and form as verified by the sequence detector 30, a reinitiating signal will be supplied to the interval timer 32 inhibiting the alarm output 36 from identifying the occurrence of a malfunction. So long as the processor is properly sequencing and periodically supplies the coded output to the asynchronous fault detector in accordance with its sequence of operation, the alarm output will not identify a malfunction. However, if the processor fails to step through its normal sequence, a coded output will not be supplied in the proper time sequence and an alarm output will be annunciated.

Additionally, the asynchronous fault detector is positioned at a remote end of the input/output bus in order to be responsive to both short and open circuit conditions within the communication lines to provide a representative fault output. Such a malfunction within the bus will inhibit the proper communication of the coded output to the asynchronous fault detector, which in turn will enable the timer interval to expire activating the alarm output 36.

In addition, the processor is enabled by a diagnostic program to run a self check and periodically communicate a coded output identifying that a valid test has occurred. As will be appreciated from the following explanation, the coded output to the asynchronous fault detector is supplied at intervals during the running of the test sufficient to continuously enable the timer output to prevent the annunciation of a malfunction.

Figure 3:
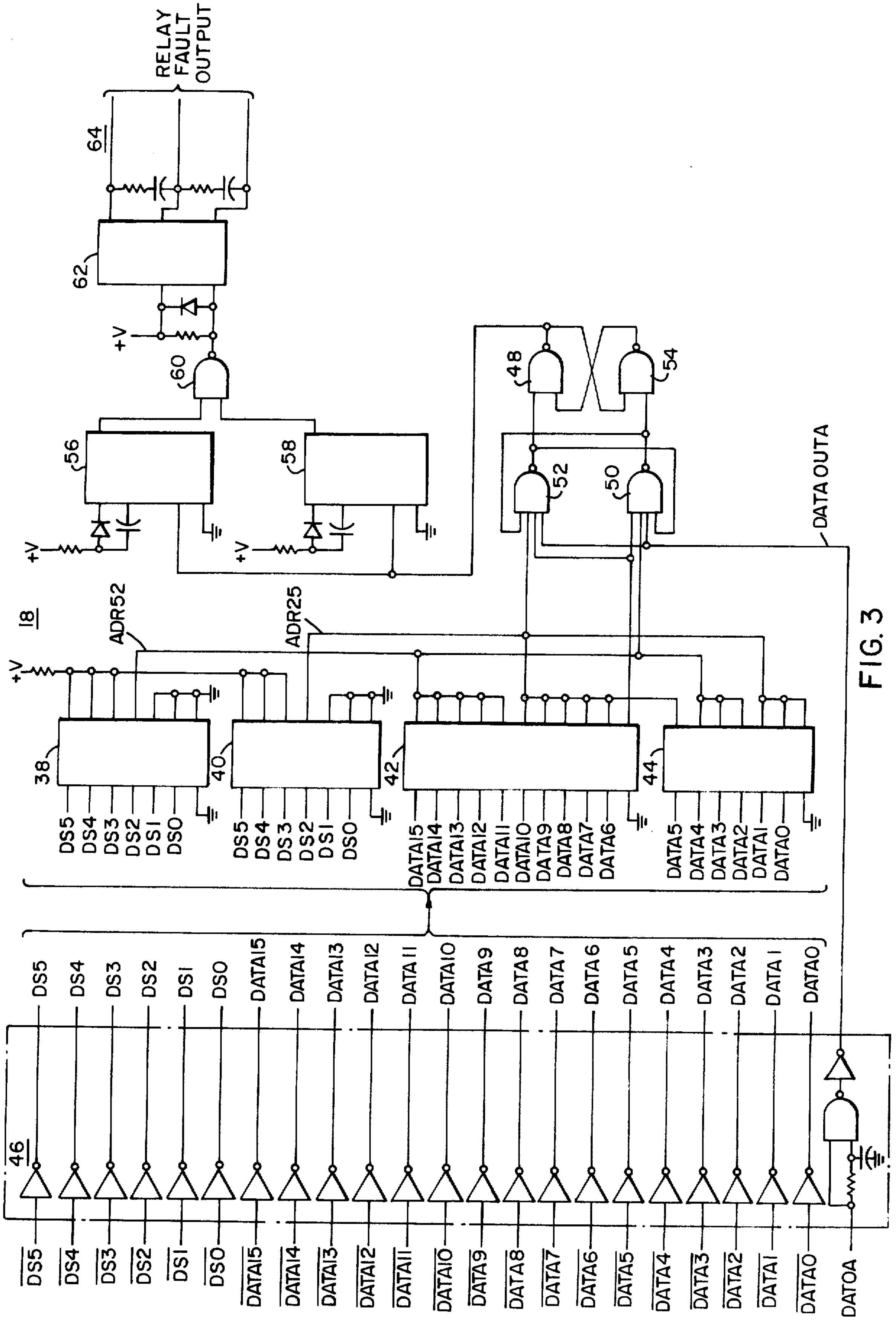
FIG. 3 is a circuitry schematic of the basic electrical components of the fault indicator of this invention.

FIG. 3 illustrates a detailed circuitry schematic of the asynchronous fault detector previously identified by reference character 18. The fault detector decodes two addresses communicated on the input/output bus address lines DSO through DS5. These addresses are exemplarily chosen as $25_8$ and $52_8$ to satisfy the particular minicomputer employed in the exemplary application set forth hereinafter. The addresses desirably complement each other so that each address line will be exercised in both states. Comparator 38 decodes addresses $52_8$ and comparator 40 decodes address $25_8$. In addition to decoding complementary addresses, the fault detector must receive a specific data word at each address. Address $25_8$ must receive data word $052525_8$ and address $52_8$ must receive data word $125252_8$. These data words are complementary in octal so that both states of each data line (DATA0 through DATA15) will be exercised. Comparators 42 and 44 provide decoding for both words. The control lines can be similarly exercised by including complementary control signals in the coded output to the fault detector. The circuit arrangement 46 merely provides the necessary signal conditioning to interface the data and address signals with the fault detector electronics.

In addition to the preselected bit combinations included in the coded output, the bit combinations must be communicated in a specific sequence. The circuit shown in FIG. 3 requires that the two addresses for the fault detector be accessed alternately. Gates 48, 50, 52 and 54 form a flip-flop which controls this sequential function. The signal DATAOUTA from DATOA on the input/output bus is a control strobe indicating that the address and the data are valid. The output of the flip-flop is used to trigger two monostables 56 and 58. Two redundant monostables are desirably employed for improved reliability. Each monostable is set in this exemplary illustration for a 150 millisecond delay. Obviously, the delay period will be chosen to meet the specific conditions to satisfy the periodicity of the data and addresses being received from the processor through the input/output bus. The outputs of the monostables are coupled to NAND gate 60 to effectively energize a relay 62 to deactivate the alarm signal for the duration of the timing interval of the monostables. Accordingly, the relay is activated as long as the monostables are continuously retriggered. Failure to retrigger the monostables within the timing interval will close the relay activating the fault output communicated through terminals 64. Thus, a malfunctioning output is available unless the system continues to supply the prescribed coded output in the desired sequence.

A thorough understanding of the invention thus described can be best appreciated illustrated in an actual application, such as flux monitoring system for nuclear reactors. One such system is generally described in patent application Ser. No. 379,159 entitled "Method of Automatically Monitoring the Power Distribution of a Nuclear Reactor Employing Movable In-Core Detectors," filed July 7, 1973, by J. J. Loving Jr. The purpose of the system is to periodically scan a nuclear reactor core using an existing movably in-core flux mapping system. The neutron flux throughout the axial height of the core is recorded, normalized and searched for unusual peaks that exceed acceptable limits. Unusual peaks in the axial offset can be attributed to abnormal localized heating in the core. The localized power increases must be kept within acceptable limits to insure the effectiveness of emergency core cooling systems in the unlikely event of severe accident conditions.

The Axial Power Distribution Monitoring System utilizes analog circuitry to normalize the axial flux data by calculating a peak to average ratio. The system then generates an alarm if the calculated ratio exceeds a fixed acceptable threshold. New specifications make it necessary to have an alarm threshold which is the function of the axial position within the core. Higher peaks can be tolerated in the bottom of the reactor core than can be tolerated at the top of the core. The alarm threshold is, therefore, monotonically decreasing with increasing height in the core. To perform this function properly, the raw data must be sampled and stored throughout the scan since the true average can only be calculated at the end of each scan. A normalized curve must be generated and compared to the variable alarm threshold. An analog implementation of this function would be very expensive and complex compared to a digital approach with a large number of samples. Accordingly, a digital computational system is desired utilizing a minicomputer such as the Data General Nova 1,220 Minicomputer manufactured by the Data General Corporation of Southboro, Mass.

In order to assure the validity of the data accumulated and the computational results processed from the accumulated data the fault indicator system of this invention is applicable to immediately alert the plant operator of improper operating conditions. Essentially, the system is as schematically presented in FIG. 2, where the computer is programmed to periodically present a selected sequence of coded outputs to the asynchronous fault detector during the course of the normal computational program. Again, the periodicity in which the coded outputs are supplied will be determined by the interval of the timer 32. In addition, as will be appreciated from the following explanation, the minicomputer is programmed to continuously run diagnostic routines in between the axial scanning periods of the flux monitor to continuously check the operation of the computer and associated equipment. During the course of each diagnostic routine the diagnostic program outputs the preselected coded output to the asynchronous fault detector to reinitiate the timer interval. In the event a malfunction is indicated during the diagnostic process, the minicomputer will not sequence through the next successive arrangement of statements and fail to output the preselected coded signal required to reinitiate the interval timer. Thus, an output will be annunciated identifying a malfunction which can be traced to the operation of the processor.

To better appreciate the steps of the method of this invention in combination with the self-checking capabilities that can be provided in a number of electrical apparatus, reference should be made to the exemplary diagnostic routine illustrated in the flow charts shown in FIGS. 4 through 11 and the exemplary program statements set forth in appendix A.

Figure 4:
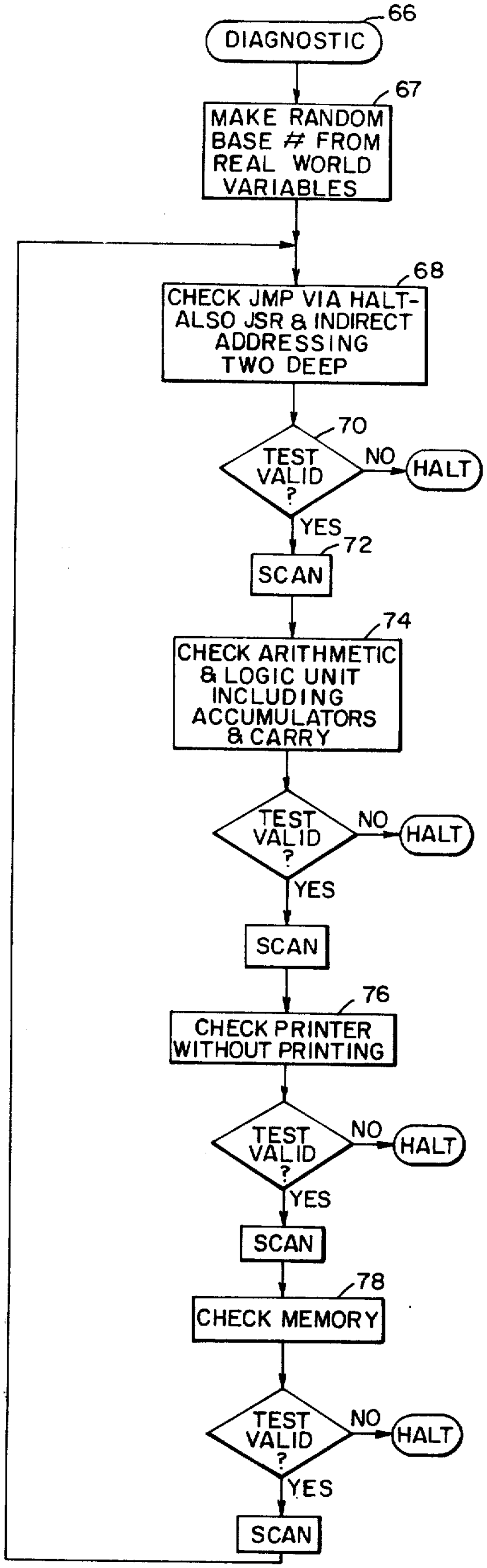
FIG. 4 is a flow diagram showing an overview of the basic diagnostic routine that can be employed in the processor application of FIG. 2 to provide the fault outputs of this invention.

FIG. 4 shows a generalized flow chart which is set forth to illustrate a simplified over-view of the diagnostic self-checking procedure. As is generally known in the programming art, the symbolic representations illustrated have special significance. An oval, for instance, indicates the beginning or ending point of a particular routine, while a rectangle indicates any processing operation except a decision, and a diamond indicates a decision. The lines leaving a decision block are labelled with the decision results that cause each path to be followed.

At the termination of each scan, in this particular application, the "DIAGNOSTIC" routine 66 is called upon to direct the computer to make a selection of a random-base number from real word variables, as indicated by the rectangular box 67. The computer then runs through a number of various tests as indicated by the remainder of the rectangular blocks illustrated in FIG. 4. For example, the computer checks the "JUMP? command via a "HALT" command and also the "JUMP SAVE RETURN" (JSR) address command and "INDIRECT ADDRESSING TWO DEEP" as indicated by the rectangular block 68. During the course of the command represented by block 68 several decisions will be required as figuratively illustrated by the diamond block 70. If a test is invalid as indicated by the decision NO, a HALT command will be initiated stopping the machine. The result of a HALT command will prevent the preselected coded output from being communicated to the asynchronous fault detector thus resulting in the annunciation of an alarm output. If the tests are valid, the program directs the computer as represented by block 72 to go to a "SCAN" subroutine which resets the fault indicator by outputing the proper sequence of codes and monitors whether a new scan in the axial flux power distribution monitoring system has started. If a scan has started, the subroutine directs the computer to return to the processing program so that new data accumulated during the course of the scan can be operated on by the main program. If a new scan has not been initiated, the subroutine SCAN directs the computer to continue the DIAGNOSTIC routine and the sequence of steps continue to check out the various functions of the computer. Block 74 sets forth the next sequence of steps, which requires the checking of arithmetic and logic operations including the accumulators and carry. Again, in the course of or at the end of this particular check the computer will again make a decision to determine whether the tests were valid and either halt the machine's operation if an invalid test has occurred, or return to the subroutine SCAN to monitor whether a new axial flux monitoring scan has occurred. Similarly, the next direction provided by block 76 checks the printer without actually requiring a print out. As before, a decision is made either in the course of or at the end of the test as to whether the test is valid. The final tests will check the memory as indicated by block 78 and if the tests are valid and no new scans have occurred, the program will revert back to the first set of tests indicated by the rectangular block 68. Thus, it can be appreciated that in between the normal operation of the system a substantially complete test of the equipment and the associated hardware is continuously performed to assure the proper operation of the apparatus and the reliability of the results obtained. During the course of each test, or at the conclusion of a test, as well as during normal operation of the scanning system the preselected code will be provided to the asynchronous fault detector to inhibit the annuciation of a malfunction. In the event a HALT command is indicated by an invalid test, the preselected code will fail to appear within the required time interval, rendering the alarm output active, annunciating the failure.

To appreciate the individual directions provided in the over-view shown in FIG. 4, reference can be had to the remaining figures which set forth in greater detail the flow charts for the particular diagnostic operations. In addition, reference can be made to the corresponding program statements in the appendix employed to direct the computer to sequence through the required events necessary to affect the various tests. During the course of the sequence of steps of the program a number of variables are called upon, which refer to pre-established values which are stored in the computer at the initiation of the programming cycle. These constants, as well as subroutines called on, are generally explained to the right of the program statements. Accordingly, an explicit understanding can be had by crossreferencing the individual flow charts to the corresponding statements set forth in the program.

Figure 5:
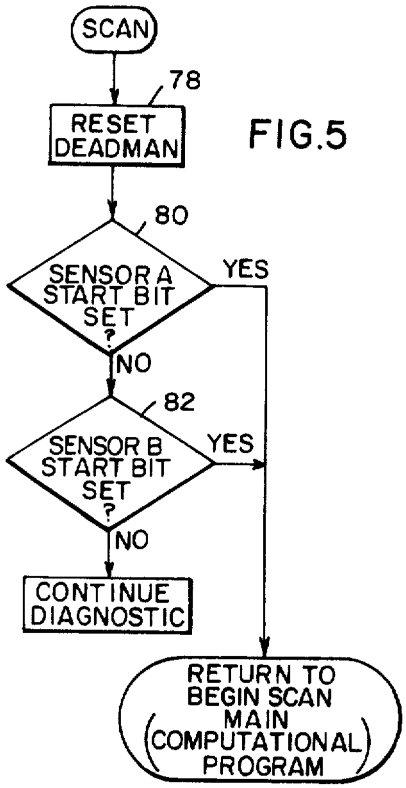
FIGS. 5, 6, 7, 8, 9, 10 and 11 respectively illustrate the various steps shown in the over-view of the diagnostic of FIG. 4.

A more detailed understanding of the SCAN subroutine is illustrated in the flow chart shown in FIG. 5. Every time the SCAN routine is called on by the diagnostic program, the computer jumps to statement 1337 and sequences through statement 1351 inclusive. Statement 1337, entitled "SAVE THE RETURN ADDRESS," is a command to the computer to remember the point of departure in the DIAGNOSTIC routine so that the computer can return to the departure point at the end of the SCAN routine and continue to carry out the remaining directions of the diagnostic statements. The first active command in the SCAN routine is the direction 78 to "RESET DEADMAN," which is a separate routine set forth in statements 1564 through 1570. In the "DEADMAN" subroutine the computer is directed to output the preselected coded addresses and data to the asynchronous fault detector so as to reinitiate the timing interval precluding the annunciation of an alarm for at least the duration of another given timing interval. After the outputs have been transmitted the subroutine directs the computer to return to the SCAN routine, where it is called upon to process a number of decisions to determine whether a new scan has initiated. Generally during the operation of the flux monitor of this application two sensors are employed and the computer makes a decision with respect to each sensor, 80 and 82, determining whether a new scan has started. If a new scan is in progress, the computer is directed to begin the scanning operational program employed to process the data accumulated by the sensors. If the decision fails to detect a scan in progress, then a direction is given to continue the DIAGNOSTIC routine. Accordingly, every time the SCAN subroutine is called on, the aforedescribed sequence of steps is performed, communicating the required coded signals to the asynchronous fault detector and monitoring the scanning sensors so as to avoid loss of new data being inputed to the main program identified by the label "BEGIN SCAN."

Figure 6:
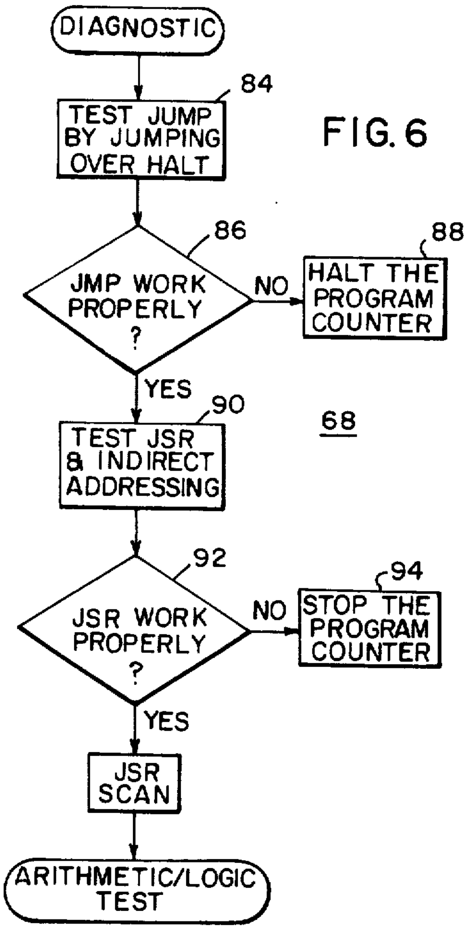

The first computer test identified in the direction block 68 is more specifically set forth in the flow chart illustrated in FIG. 6. The first processing operation and decision indicated by the rectangular blocks 84 and 88 and the diamond representation 86 is embodied in program statements 424 through 430 inclusive. In accordance with these statements the computer is directed to test the "JUMP" command by directing a jump over a HALT command. If the jump is ineffective, the program will sequence the HALT command stopping the entire machine. Accordingly, the decision block 86 questions whether the jump was effected properly and if not, halts the program counter. If the jump was effected properly as indicated by the path "yes", then the DIAGNOSTIC routine sequences to the next test. The remaining test performed in the sequence illustrated in FIG. 6 checks the "JUMP SAVE RETURN" (JSR) address which is normally employed to jump to another particular point in the program and remember the point of demarkation from the program so the computer can later return to the departure point in the program at a directed point in the sequence of operations to be performed. The JSR address distinguishes from the JUMP statement which does not require the computer to note the point at which the jump occurred. Program statements 431 through 445 direct the individual operations called for in the flow chart representations 90, 92 and 94. The rectangular block 90 tests the JUMP SAVE RETURN address and "INDIRECT ADDRESSING." The decision block 92 questions whether the previous test has been performed properly and if the decision is NO the program transfers to the direction to "STOP THE PROGRAM COUNTER." The HALT direction provided by block 88 distinguishes from the STOP direction provided by block 94, in that the HALT command completely stops the machine while the STOP command effectively stops execution of the program while the machine continues to run. If the JSR test is valid, the program directs the computer to continue with the testing operation as specified in block 74 shown in the over-view of FIG. 4. The arithmetic and logic testing is accomplished in a manner similar to that set forth above by program statements 446 through 524 inclusive. The computer's response to the particular statements enumerated will be obvious to those skilled in the programming art. Again, it can be appreciated by reference to statement 445 in the program that the scan subroutine is periodically called upon to output the required coded data to the asynchronous fault detector and check whether any new scans have been initiated.

Figure 7:
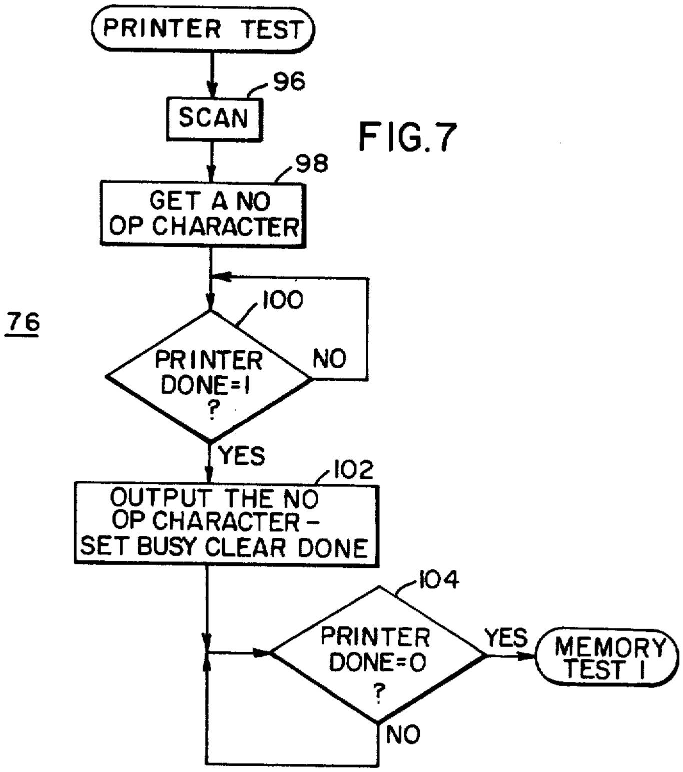

The next test performed in the DIAGNOSTIC routine illustrated in FIG. 7 is a check of the printer without actually requiring a printout. The corresponding program directions are presented in statements 525 through 537. As can be appreciated once again, the SCAN routine is called upon by statement 525 to effect reinitiation of the interval timer within the asynchronous fault detector and check the initiation of new scans. The corresponding flow chart instruction is presented in direction block 96. After the proper coded outputs have been provided and an indication has been supplied that no new scans have occurred, the program continues to sequence the printer test. Basically, as indicated by direction block 98, the computer selects a NO OP CHARACTER, which is a non-operative character that will not be printed by the printer, but will enable a check of the printer interface. The next decision loop 100 enables the printer flags to cycle while the program circles around the NO decision loop until this particular operation is complete. When the operation is complete, direction block 102 outputs the NO OP CHARACTER to the printer to check if the communication lines are intact. The decision loop 104 gives the printer adequate time to accept the data. Since a non-operative character was selected, the printer will not actually print, but the integrity of the communication lines will have been tested. If for any reason, this particular operation cannot be completed due to improper operation of the printer, the computer will be hung up in either decision loop 100, 102 or 104 and will not call upon the SCAN routine in enough time to output the preselected coded data to the asynchronous fault detector to reinitiate the timing interval before an alarm is annunciated. If the printer test is successful, the program will sequence to the computer memory test instructed by block 78 in the over-view shown in FIG. 4.

FIGS. 8, 9, 10 and 11 provide the flow charts for eight separate memory tests that are performed as the last sequence of events in the DIAGNOSTIC routine before the diagnostic sequence is repeated.

Figure 8:
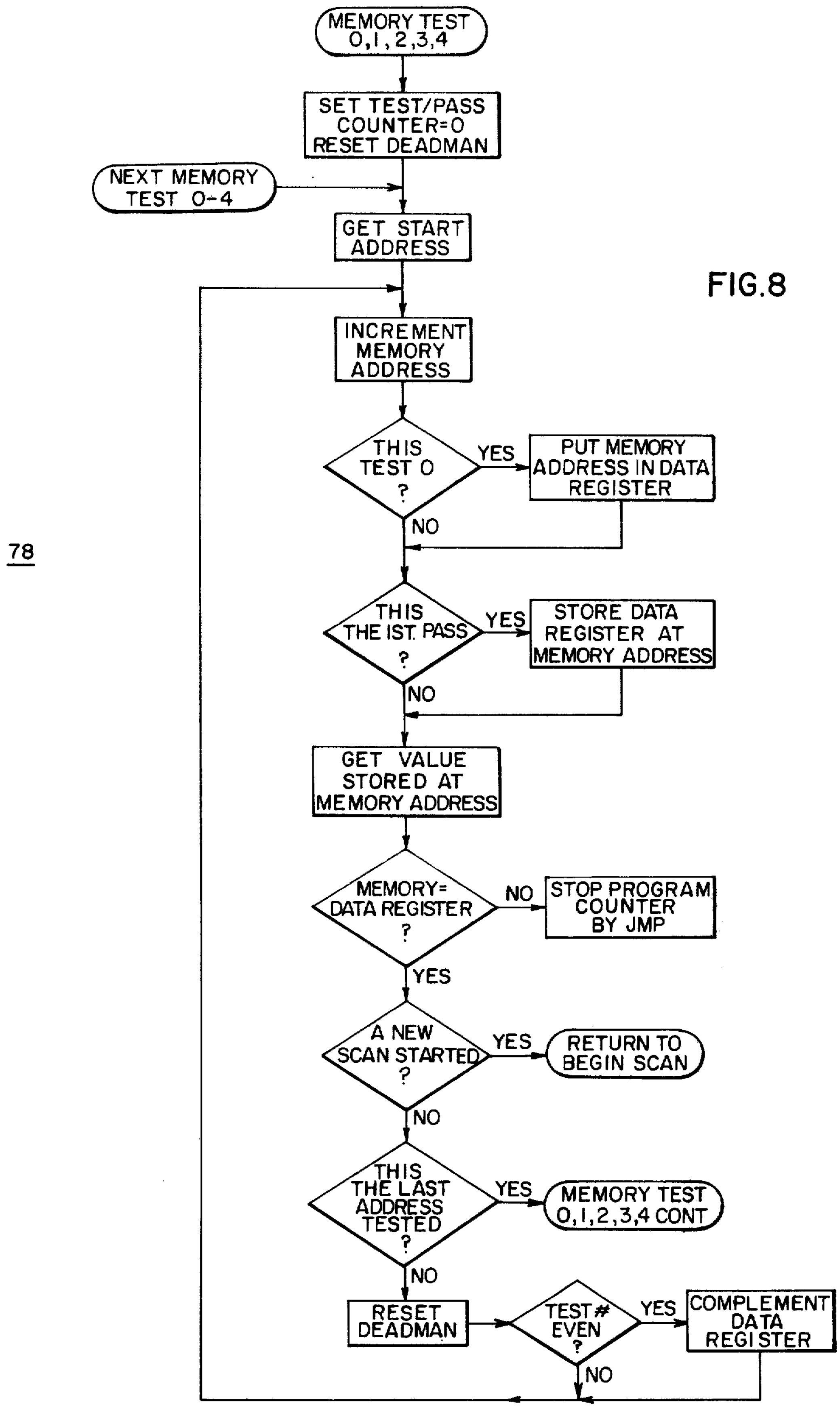
Figure 9:
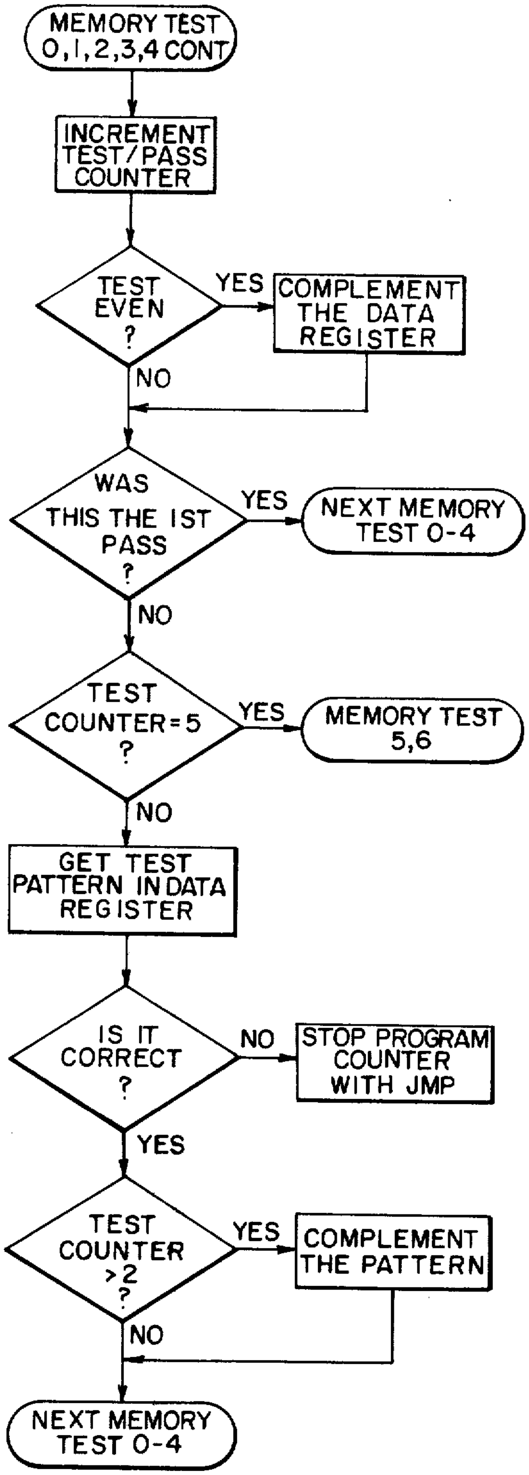

Memory tests 0 through 4 are figuratively illustrated in the flow chart in FIG. 8 and are generally described by the sequence of corresponding program statements 540 through 623. It can be appreciated that one of the first statements directed is to reset the deadman, which is a command to call upon the DEADMAN routine, previously identified, to output the prescribed coded addresses and data words to the asynchronous fault detector. Essentially, test 0 loads the address for each memory location into its corresponding location and tests 1 through 4 check each state of the respective bits employing various bit patterns. FIG. 9 is a continuation of the flow chart directions illustrated in FIG. 8 and is carried over from the point designated by the oval marking "MEMORY TEST 0, 1, 2, 3, 4, CONTINUE."

Figure 10:
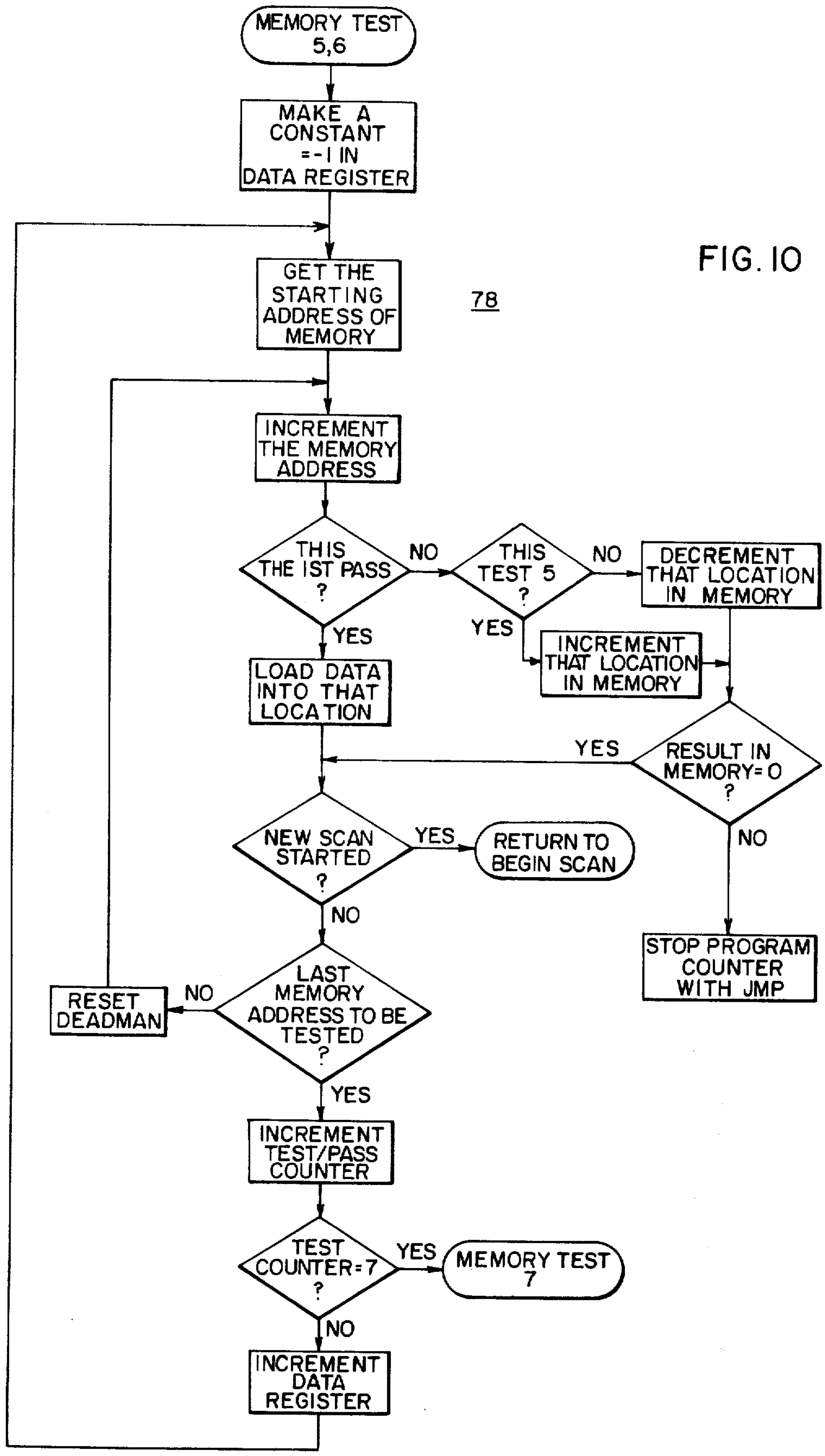

Memory tests 5 and 6 are similarly implemented as indicated by the flow chart in FIG. 10 and the corresponding program statements 624 through 673. Essentially, test 5 loads "1's" into all memory locations and then increments each location prior to checking whether the result is 0. Memory test 6 loads an octal 1 in each location and decrements each location (i.e., subtracts 1 in octal) and checks that the result is 0, indicating that the test is valid.

Figure 11:
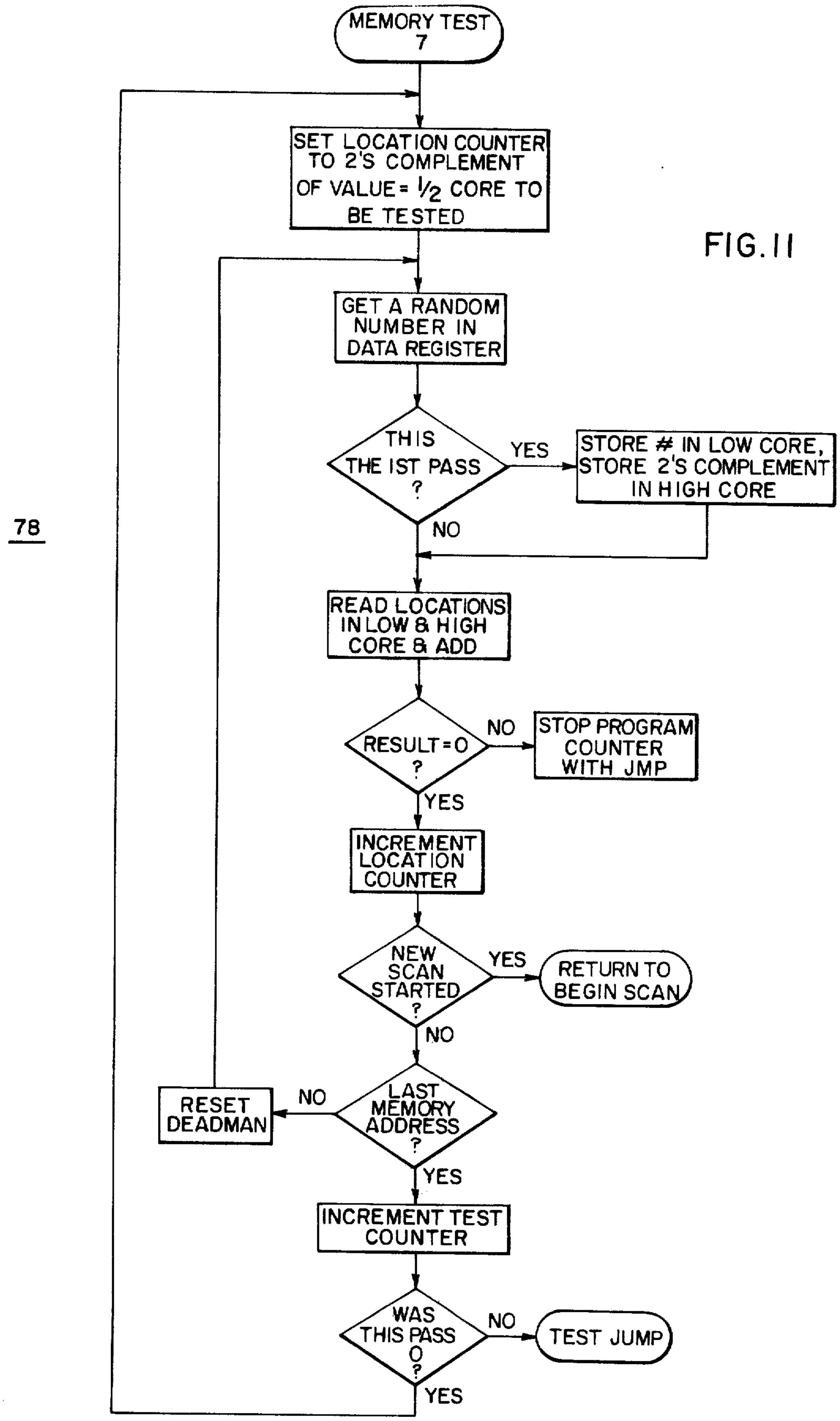

Similarly, FIG. 11 illustrates the flow diagram for memory test 7 which corresponds to the program statements 674 through 762 set forth in the appendix. Essentially, memory test 7 calls upon the random base number generated by block 67 in the over-view provided in FIG. 4, and implemented by the corresponding program statements 377 through 423. using this number as a base, test 7 establishes a plurality of new random numbers which are correspondingly loaded into each location in the lower half of the memory. In addition, the test loads the two's complement representative of the corresponding negative counterpart to the plurality of random numbers in the upper half of the memory core and then adds each number to its complement to check that the result is 0. As before, the deadman output is supplied sequentially upon the completion of a proper test result. When the test is concluded, the computer is directed to return to the "CHECK JUMP" test indicated by block 68 in the overview.

Figure 12:
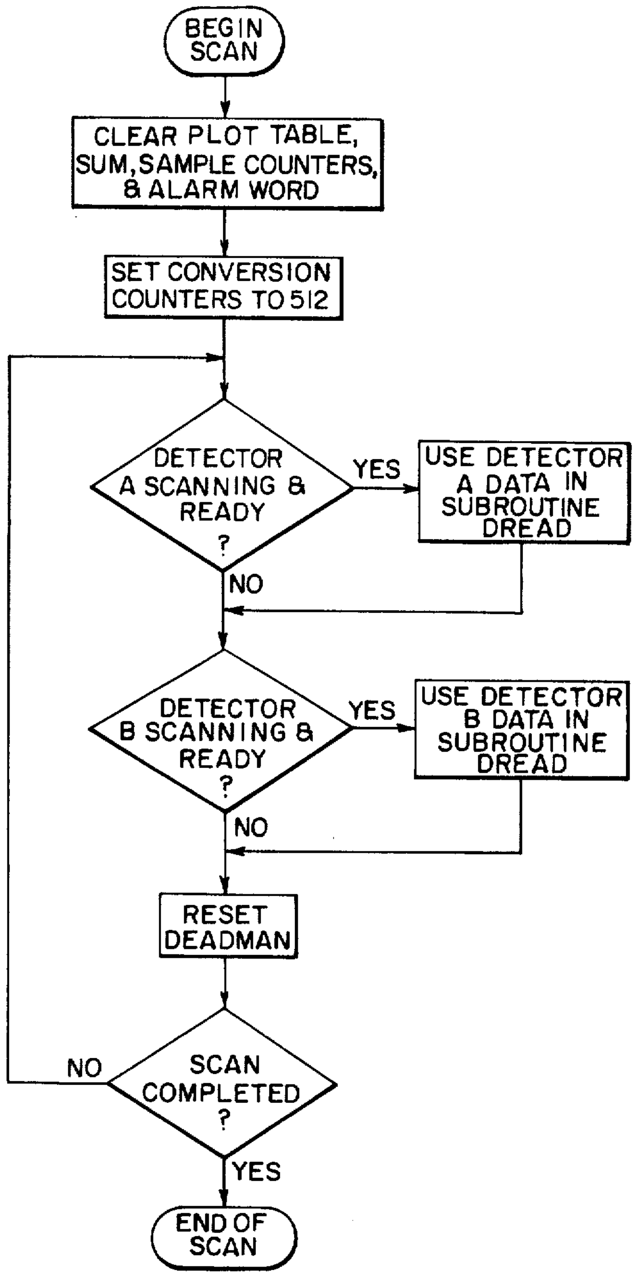
FIG. 12 illustrates a flow chart of an exemplary program employed in the processor application providing the fault output monitored by this invention.

FIG. 12 illustrates an over-view of a portion of the basic computational program employed in the course of each scan of the flux monitoring system. It is employed to input data generated by the sensors as they move through the core. The figure is provided to show that in the normal course of the operation of the flux monitoring system the preselected coded outputs are communicated to the asynchronous fault detector as directed by the block RESET DEADMAN. The particular routine illustrated in FIG. 12 is more fully described in application Ser. No. 522,190, entitled A METHOD OF CONVERTING AN ANALOG SIGNAL INTO A DIGITAL REPRESENTATION by J. A. Neuner, C. W. Einolf, Jr., and A. I. Szabo, filed Nov. 8, 1974.

Accordingly, this invention can be implemented to perform self-diagnostics upon the apparatus being monitored, annunciating faults indicated by the failure of an occurrence of an active periodic coded output to the fault indication means previously described.

Though this invention has been described in this preferred embodiment in an application to digital communication systems where it has explicit advantages over conventional monitoring systems, and to digital processing communication systems where it has special benefits, it can well be appreciated that the invention can be incorporated to monitor faults during the operation of various types of apparatus, not necessarily involving the transmission of information.

APPENDIX

```
STATEMENT    MACHINE
NO. IN       LANGUAGE                INPUT CARD
OCTAL

                         ;
                                                 ;DIAGNOSTICS WITH PERIODIC SCAN CHECKS-START LOC 377
                         ;

             000377                .LOC 377
                         ;
                                                 ;RANDOM # BASE GENERATOR FROM REAL WORLD CHAGING DATA
                                                        ;USE SAMPLES FROM PLOTA THROUGH DATA B
                                                        ;FORM SAMPLING RATE (1 TO 377 OCTAL) FROM #SAMPLES
                                                        ;F(Z)MAX & EXCESS FOR EACH SENSOR
00377        022052      DIAG:     LDA     0,@NSAMA       ;GET # SAMPLES SENSOR A
00400        026066                LDA     1,@FZMXA       ;GET MAX F(Z) SENSOR A
00401        123700                ANDS    1,0            ;MIX THEM
00402        032067                LDA     2,@EXMRA       ;GET MAX EX/MAR SENSOR A
00403        143100                ADDL    2,0            ;MIX IT IN
00404        026075                LDA     1,@NSAMB       ;GET # SAMPLES FOR SENSOR B
00405        032112                LDA     2,@EXMRB       ;GET EX/MAR FOR SENSOR B
00406        147700                ANDS    2,1            ;MIX THEM
00407        032111                LDA     2,@FZMXB       ;GET MAX F(Z) SENSOR B
00410        147100                ADDL    2,1            ;MIX IT IN
00411        123140                ADDOL   1,0            ;STIR IT ALL UP
00412        024162                LDA     1,MSK06        ;GET MASK = 127 DECIMAL
00413        034240                LDA     3,SAVE         ;GET STOPPING LOC
00414        107540                ANDOL   0,1            ;1< SAMPLE RATE IN AC0 < 256 DECIMAL
00415        030051                LDA     2,PLOTA        ;GET STARTING LOC
00416        133000                ADD     1,2            ;MAKE POINTER
00417        035000                LDA     3,0,2          ;GET SAMPLE
00420        167300                ADDS    3,1            ;MIX IN SAMPLE
00421        156422                SUBZ    2,3,SZC        ;TIME TO STOP
00422        000773                JMP     .-5            ;NO - DO NEXT SAMPLE
00423        042051                STA     0,@PLOTA       ;YES - STORE RANDOM # @ PLOTA
```

```
STATEMENT    MACHINE
NO. IN       LANGUAGE                INPUT CARD
OCTAL

                                                 ;DIAGNOSTICS
                         ;
                                                        ;CHECK JUMP VIA HALT
                                                        ;LOC 5 IS HALT IN CASE JMP MODE 1 WORKS AS MODE0
00424        030776      CHJMP:    LDA     2,CHJMP-2      ;PREPARE AC2 IN CASE JMP MODE 1 WORKS AS MODE 2
00425        034775                LDA 3,CHJMP-2          ;PREPARE AC3 IN CASE JMP MODE 1 WORKS AS MODE 3
00426        000405                JMP     .+5            ;CAN MACHINE JMP PROPERLY MODE 1 EFFECTIVE ADD ?
00427        063077                HALT                   ;NO-HALT
00430        063077                HALT                   ;HALT-THE JMP WAS SEEN AS SKIP OR MODE 2 OR 3
00431        056240                STA     3,@SAVE        ;SAVE THE RETURN ADDRESS
00432        002241                JMP     @RETN          ;CHECK INDIRECT ADDRESSING TWO DEEP
00433        004776                JSR     .-2            ;CAN MACHINE JSR PROPERLY ?
00434        001401                JMP     +1,3           ;CHECK RELATIVE INDEXING -MODE 3
00435        171000                MOV     3,2            ;SET AC2 = PC MINUS 1
00436        001003                JMP     +3,2           ;CHECK RELATIVE INDEXING - MODE2
00437        020135                LDA     0,CON15        ;GET CONSTANT = DECIMAL 1
00440        101224                MOVZR   0,0,SZR        ;DID EFFECTIVE ADD MODE 1 OF PREV. INST. WORK ?
00441        000400                JMP     .              ;NO-STOP HERE
00442        101003                MOV     0,0,SNC        ;YES-DOUBLE CHECK
00443        000400                JMP     .              ;NO-STOP HERE
00444        006200                JSR     @.SCAN         ;HAS A NEW SCAN STARTED
00445        002204                JMP     @.SCN1         ;YES-TAKE IN NEW DATA
                         ;
                         ;
```

APPENDIX—Continued

| STATEMENT NO. IN OCTAL | MACHINE LANGUAGE | INPUT CARD | | |
|---|---|---|---|---|
| | | | | ;ARITHMETIC/LOGIC TEST |
| | | | | ;CHECK EACH ACCUMULATOR,CARRY,SUB,COM,INC,AND,ADD, |
| | | | | ;NEG,SKP,SZC,SNC,SZR,SNR,Z,O,C,MOV,& ADC |
| | | | | ;BY SETTING ALL AC = -1 + THEN 0 TO CHECK EACH BIT |
| 00446 | 102442 | SUBO | 0,0,SZC | ;CLEAR AC0 + CARRY-CHECK SUB,O,+ SZC (SKIP REQD) |
| 00447 | 000400 | JMP | . | ;STOP PROGRAM COUNTER |
| 00450 | 176422 | SUBZ | 3,3,SZC | ;CLEAR AC3 & SET CARRY-CHECK SUB,Z,SZC(NO SKIP) |
| 00451 | 100003 | COM | 0,0,SNC | ;SET AC 0 = -1,CHECK COM & SNC (SKIP REQD) |
| 00452 | 000400 | JMP | . | ;STOP PROGRAM COUNTER |
| 00453 | 105023 | MOVZ | 0,1,SNC | ;SET AC1 = -1,CHECK MOV,Z,+ SNC (NO SKIP REQD) |
| 00454 | 131001 | MOV | 1,2,SKP | ;SET AC2 = -1,CHECK MOV,+ SKP |
| 00455 | 000400 | JMP | . | ;STOP PROGRAM COUNTER |
| 00456 | 123463 | ANDC | 1,0,SNC | ;CHECK AND (ALL 1'S RESULT) & C |
| 00457 | 000400 | JMP | . | ;STOP PROGRAM COUNTER |
| 00460 | 176004 | ADC | 3,3,SZR | ;SET AC3 = -1,CHECK ADC,& SZR (NO SKIP REQD) |
| 00461 | 101404 | INC | 0,0,SZR | ;CLEAR AC 0,CHECK INC,& SZR (SKIP REQD) |
| 00462 | 000400 | JMP | . | ;STOP PROGRAM COUNTER |
| 00463 | 107405 | AND | 0,1,SNR | ;CLEAR AC1, CHECK AND (ALL 0'S RESULT)& SNR (NO SKIP REQD) |
| 00464 | 125145 | MOVOL | 1,1,SNR | ;SET AC1 = +1,CHECK MOV,O,& SNR (SKIP REQD.) |
| 00465 | 000400 | JMP | . | ;STOP PROGRAM COUNTER |
| 00466 | 133004 | ADD | 1,2,SZR | ;CLEAR AC2, CHECK ADD |
| 00467 | 000400 | JMP | . | ;STOP PROGRAM COUNTER |
| 00470 | 124400 | NEG | 1,1 | ;SET AC1 = -1, CHECK NEG |
| 00471 | 136404 | SUB | 1,3,SZR | ;CLEAR AC3, CHECK SUB,NEG,& SZR |
| 00472 | 000400 | JMP | . | ;STOP PROGRAM COUNTER |
| | | | | ;CHECK ROTATE LEFT,RIGHT,SWAP,SEZ,SBN, & # |
| 00473 | 020163 | LDA | 0,MSK07 | ;GET DEADMAN MASK = 125252 OCTAL |
| 00474 | 105140 | MOVOL | 0,1 | ;SHIFT MASK = ROTATE LEFT |
| 00475 | 107006 | ADD | 0,1,SEZ | ;ADD MASKS,CHECK ROTATE LEFT & SEZ(NO SKIP REQD) |
| 00476 | 124004 | COM | 1,1,SZR | ;CHECK ROTATE LEFT |
| 00477 | 000400 | JMP | . | ;STOP PROGRAM COUNTER |
| 00500 | 111226 | MOVZR | 0,2,SEZ | ;SHIFT MASK = ROTATE RIGHT,CHECKSEZ (SKIP REQD.) |
| 00501 | 000400 | JMP | . | ;STOP PROGRAM COUNTER |
| 00502 | 113007 | ADD | 0,2,SBN | ;ADD MASKS,CHECK SBZ (NO SKIP REQD) |
| 00503 | 150004 | COM | 2,2,SZR | ;CHECK ROTATE RIGHT |
| 00504 | 000400 | JMP | . | ;STOP PROGRAM COUNTER |
| 00505 | 034165 | LDA | 3,MSK09 | ;GET LOW BYTE MASK = 377 OCTAL |
| 00506 | 161327 | MOVZS | 3,0,SBN | ;SWAP BYTES, CHECK SBN (NO SKIP REQD) |
| 00507 | 163456 | ANDO | 3,0,SEZ # | ;AND TO CHECK SWAP & SEZ (SKIP REQD) |
| 00510 | 000400 | JMP | . | ;STOP PROGRAM COUNTER |
| 00511 | 163047 | ADDO | 3,0,SBN | ;CHECK SBN (SKIP REQD) |
| 00512 | 000400 | JMP | . | ;STOP PROGRAM COUNTER |
| 00513 | 100004 | COM | 0,0,SZR | ;CHECK SWAP & # |
| 00514 | 000400 | JMP | . | ;STOP PROGRAM COUNTER |
| 00515 | 020163 | LDA | 0,MSK07 | ;GET DEADMAN MASK = 125252 OCTAL |
| 00516 | 105000 | MOV | 0,1 | ;MOVE IT |
| 00517 | 030162 | LDA | 2,MSK06 | ;GET MULTIPLIER = 127 DECIMAL |
| 00520 | 006217 | JSR | @.MPYU | ;MULTIPLY AC1 BY AC2 |
| 00521 | 006222 | JSR | @.DIVU | ;DIVIDE RESULT BY AC2 |
| 00522 | 020163 | LDA | 0,MSK07 | ;GET DEADMAN MASK |
| 00523 | 106414 | SUB | 0,1,SZR # | ;IS RESULT = DEADMAN MASK |
| 00524 | 000400 | JMP | . | ;NO-STOP PROGRAM COUNTER |
| | | | | ;CHECK PRINTER BUSY & DONE FLAGS ? |
| 00525 | 006200 | JSR | @.SCAN | ;HAS A NEW SCAN STARTED ? |
| 00526 | 002204 | JMP | @.SCN1 | ;YES-TAKE IN DATA |
| 00527 | 102400 | SUB | 0,0 | ;NO-GET ASCII NULL IN LOW BYTE OF AC0 |
| 00530 | 060151 | NIOS | 51 | ;START PRINTER IN CASE TURNED OFF |
| 00531 | 063651 | SKPDN | 51 | ;IS PRINTER DONE FLAG = 1 ? |
| 00532 | 000777 | JMP | .-1 | ;NO-TRY AGAIN |
| 00533 | 061151 | DOAS | 0,51 | ;PRINT A NULL, SET BUSY-CLEAR DONE |
| 00534 | 063751 | SKPDZ | 51 | ;IS DONE CLEARED ? |
| 00535 | 000777 | JMP | .-1 | ;NO-TRY AGAIN |
| 00536 | 006200 | JSR | @.SCAN | ;YES-PRINTER INTERFACE GOOD, NEW SCAN STARTED ? |
| 00537 | 002204 | JMP | @.SCN1 | ;YES-TAKE IN DATA |

APPENDIX—Continued

```
STATEMENT   MACHINE
NO. IN      LANGUAGE         INPUT CARD
OCTAL

                                                  ;MEMORY DIAGNOSTIC TESTS
                                                  ;EIGHT DIAGNOSTIC TESTS-EACH HAS TWO PASSES
                                                  ;PASS ZERO STORES VALUE IN CORE & CHECKS VIA
                                                  ;LDA IMMEDIATELY (FAILURES HERE OFTEN DUE TO
                                                  ;CORE DRIVERS OR SENSE AMPLIFIERS)
                                                  ;PASS ONE CHECKS MEMORY LOCATIONS VIA LDA AGAIN
                                                  ;(FAILURE HERE OFTEN DUE TO INTERFERENCE FROM
                                                  ;OTHER LOC) IF PROGRAM STOPS DURING TEST USUALLY
                                                  ;AC0 BIT 15 = PASS INDICATOR
                                                  ;AC0 BITS 12 THRU 14 = TEST INDICATOR
                                                  ;AC1 = INVALID DATA FROM CORE & MISC
                                                  ;AC2 = CORRECT DATA THAT WAS STORED IN CORE
                                                  ;AC3 = FAILED CORE LOC ADDRESS
                                                  ;TEST 0 - CHECK MEMORY ADDRESSING CIRCUITS BY
                                                     ;STORING ADDRESS OF LOC IN LOC
                                                  ;TEST 1 - CHECK BOTH STATES OF EACH CORE BIT
                                                     ;USING CHECKERBOARD PATTERN 125252 OCTAL
                                                  ;TEST 2 - CHECK INTERFERENCE BETWEEN LOC BY
                                                     ;STORING 125252 & 052525 ALTERNATELY
                                                  ;TEST 3 - CHECK OPPOSITE STATE OF EACH CORE BIT
                                                     ;CHECKED IN TEST 2 BY STORING 052525 OCTAL
                                                  ;TEST 4 - SIMILAR TO TEST 3 BUT OPPOSITE PATTERN
                                                     ;STORED IN EACH LOC
                                                  ;TEST 5 - STORE 177777 OCTAL IN EACH LOC PASS 0
                                                     ;CHECK ISZ ON EACH LOC IN PASS 1
                                                  ;TEST 6 - STORE 000001 OCTAL IN EACH LOC PASS 0
                                                     ;CHECK DSZ ON EACH LOC IN PASS 1
                                                  ;TEST 7 - PASS 0 STORE RANDOM #'S IN BOTTOM HALF
                                                     ;OF CORE, 2'S COMPLEMENT IN TOP HALF -
                                                     ;PASS 1-RECALL #, ADD & CHECK RESULT = 0
                                                  ;TESTS 1 THRU 5
00540   006207   MEMT1:  JSR     @.DEDM           ;RESET DEADMAN
00541   102440           SUBO    0,0              ;SET TEST PASS CTR = 0
00542   034051           LDA     3,PLOTA          ;GET STARTING ADDRESS
00543   175400           INC     3,3              ;INCREMENT MEMORY ADDRESS
00544   101235           MOVZR   0,0,SNR  #       ;IS THIS TEST 0 ?
00545   171000           MOV     3,2              ;YES-PUT MEMORY ADDRESS IN DATA REGISTER
00546   101213           MOVR    0,0,SNC  #       ;IS THIS THE FIRST PASS ?
00547   051400           STA     2,0,3            ;YES-STORE DATA REGISTER AT MEMORY ADDRESS
00550   025400           LDA     1,0,3            ;GET VALUE STORED AT MEMORY ADDRESS
00551   132414           SUB     1,2,SZR  #       ;DOES MEMORY = DATA REGISTER ?
00552   000400           JMP     .                ;NO-STOP PROGRAM COUNTER
00553   064474           DIA     1,74             ;GET DETECTOR A
00554   125100           MOVL    1,1              ;ROTATE DATA LEFT
00555   125100           MOVL    1,1              ;ROTATE DATA LEFT
00556   125102           MOVL    1,1,SZC          ;ROTATE DATA LEFT-HAS A SCAN STARTED ?
00557   002204           JMP     @.SCN1           ;YES-TAKE IN DATA
00560   064464           DIA     1,64             ;NO-GET DETECTOR B
00561   125100           MOVL    1,1              ;ROTATE LEFT
00562   125100           MOVL    1,1              ;ROTATE LEFT
00563   125102           MOVL    1,1,SZC          ;ROTATE DATA LEFT-HAS A NEW SCAN STARTED ?
00564   002204           JMP     @.SCN1           ;YES-TAKE IN DATA
00565   024150           LDA     1,CON26          ;NO-GET LAST ADDRESS TO BE TESTED
00566   166415           SUB     3,1,SNR  #       ;WAS THIS THE LAST ADDRESS TO BE TESTED ?
00567   000411           JMP     .+11             ;YES-ADJUST TEST CTR & RESET DEADMAN
00570   024163           LDA     1,MSK07          ;GET DEADMAN MASK
00571   065052           DOA     1,52             ;OUTPUT S1
00572   124000           COM     1,1              ;COMPLEMENT THE DEADMAN MASK
00573   065025           DOA     1,25             ;OUTPUT S2
00574   105200           MOVR    0,1              ;PREPARE TEST CTR FOR EVEN TEST
00575   125223           MOVZR   1,1,SNC          ;IS TEST # EVEN ?
00576   150000           COM     2,2              ;YES-COMPLEMENT THE DATA REGISTER
00577   000744           JMP     MEMT1+3          ;NO-CHECK THE NEXT LOC
00600   101400           INC     0,0              ;INCREMENT THE TEST CTR
00601   105200           MOVR    0,1              ;PREPARE TEST CTR FOR EVEN TEST
00602   125223           MOVZR   1,1,SNC          ;IS TEST # EVEN ?
00603   150000           COM     2,2              ;YES-COMPLEMENT DATA REGISTER
00604   101212           MOVR    0,0,SZC  #       ;WAS THIS THE FIRST PASS ?
00605   000735           JMP     MEMT1+2          ;YES-DO SECOND PASS
00606   024136           LDA     1,CON16          ;NO-GET CONSTANT = 10
00607   106405           SUB     0,1,SNR          ;DOES TEST CTR = 5 ?
00610   000414           JMP     MEMT5            ;YES-GO TO MEMORY TESTS 5 & 6
00611   030163           LDA     2,MSK07          ;NO-GET TEST PATTERN TO DATA REGISTER
00612   145140           MOVOL   2,1              ;PREPARE FOR TEST OF TEST PATTERN
00613   147003           ADD     2,1,SNC          ;IS THE PATTERN RIGHT ?
00614   000400           JMP     .                ;NO-STOP PROGRAM COUNTER
00615   124004           COM     1,1,SZR          ;CHECK PATTERN AGAIN-IS IT RIGHT ?
00616   000400           JMP     .                ;NO-STOP THE PROGRAM COUNTER
00617   126520           SUBZL   1,1              ;YES-GET A CONSTANT = 1 DECIMAL
00620   127120           ADDZL   1,1              ;MULTIPLY BY 4 TO GET DECIMAL 4
00621   106403           SUB     0,1,SNC          ;IS TEST CTR > 2 ?
00622   150000           COM     2,2              ;YES-COMPLEMENT THE TEST PATTERN
00623   000717           JMP     MEMT1+2          ;DO NEXT TEST
                 ;
```

APPENDIX—Continued

```
STATEMENT
 NO. IN     MACHINE
 OCTAL      LANGUAGE              INPUT CARD

                                                       ;TESTS 5&6 - AC1 & AC2 NOT APPLICABLE
00624       152400      MEMTS:  SUB     2,2            ;CLEAR DATA REGISTER
00625       150000              COM     2,2            ;GET -1 DECIMAL IN DATA REGISTER
00626       034051              LDA     3,PLOTA        ;GET STARTING ADDRESS OF MEMORY
00627       175400              INC     3,3            ;INCREMENT THE MEMORY ADDRESS
00630       101213              MOVR    0,0,SNC   #    ;IS THIS THE FIRST PASS
00631       000412              JMP     .+12           ;YES- LOAD DATA REGISTER INTO THAT LOC
00632       024151              LDA     1,CON27        ;NO-GET CONSTANT = 11 DECIMAL
00633       106404              SUB     0,1,SZR        ;IS THIS SECOND PASS OF TEST 5
00634       000404              JMP     .+4            ;NO-DO SECOND PASS OF TEST 6
00635       011400              ISZ     0,3            ;YES-INCREMENT MEM. LOC - IS RESULT = 0
00636       000400              JMP     .              ;NO-STOP PROGRAM COUNTER
00637       000405              JMP     .+5            ;YES-GO ON WITH TEST
00640       015400              DSZ     0,3            ;DECREMENT MEMORY LOCATION-IS RESULT 0
00641       000400              JMP     .              ;NO-STOP PROGRAM COUNTER
00642       000402              JMP     .+2            ;YES-GO ON WITH TEST
00643       051400              STA     2,0,3          ;STORE DATA REGISTER IN MEMORY LOC
00644       064474              DIA     1,74           ;GET DETECTOR A
00645       125100              MOVL    1,1            ;ROTATE DATA LEFT
00646       125100              MOVL    1,1            ;ROTATE DATA LEFT
00647       125102              MOVL    1,1,SZC        ;ROTATE DATA LEFT-HAS A SCAN STARTED ?
00650       002204              JMP     @.SCN1         ;YES-TAKE IN DATA
00651       064464              DIA     1,64           ;NO-GET DETECTOR B
00652       125100              MOVL    1,1            ;ROTATE LEFT
00653       125100              MOVL    1,1            ;ROTATE LEFT
00654       125102              MOVL    1,1,SZC        ;ROTATE DATA LEFT-HAS A NEW SCAN STARTED ?
00655       002204              JMP     @.SCN1         ;YES-TAKE IN DATA
00656       024150              LDA     1,CON26        ;NO- GET LAST MEMORY LOC TO BE TESTED
00657       166405              SUB     3,1,SNR        ;WAS THIS THE LAST LOC
00660       000406              JMP     .+6            ;YES-INC TEST/PASS CTR & GO ON
00661       024163              LDA     1,MSK07        ;NO-GET DEADMAN MASK
00662       065052              DOA     1,52           ;OUTPUT S1
00663       124000              COM     1,1            ;COMPLEMENT THE DEADMAN MASK
00664       065025              DOA     1,25           ;OUTPUT S2
00665       000742              JMP     MEMTS+3        ;DO THE NEXT LOC
00666       101400              INC     0,0            ;INCREMENT THE TEST/PASS CTR
00667       024152              LDA     1,CON28        ;GET CONSTANT = 14 DECIMAL
00670       106405              SUB     0,1,SNR        ;DOES TEST CTR = 7
00671       000403              JMP     MEMT7          ;YES-GO TO MEMORY TEST 7
00672       151400              INC     2,2            ;NO-INCREMENT THE DATA REGISTER
00673       000733              JMP     MEMTS+2        ;DO MEMORY TEST 6
                                                       ;TEST 7 - WORK FROM CENTER TO ENDS
                                                       ;FAILED LOC'S = PLOTA - AC3 +  CON26 + AC3 + 1
                                                       ;DATA-LOW CORE IN AC 1 ; HIGH CORE IN AC2
00674       034051      MEMT7:  LDA     3,PLOTA         ;GET STARTING ADDRESS
00675       024150              LDA     1,CON26         ;GET LAST ADDRESS TO BE TESTED
00676       136640              SUBOR   1,3             ;MAKE 2'S COMP OF LOC CTR
                                                       ;RANDOM # GENERATOR FROM CHECKERBOARD 4
00677       026051              LDA     1,@PLOTA        ;GET OLD RANDOM #
00700       030165              LDA     2,MSK09         ;GET BYTE MASK
00701       133700              ANDS    1,2             ;HI BYTE = LO BYTE OF #, LO BYTE CLEAR IN MASK
00702       151120              MOVZL   2,2             ;ROTATE MASK LEFT
00703       133120              ADDZL   1,2             ;ADD # TO MASK & ROTATE LEFT
00704       151120              MOVZL   2,2             ;MULTIPLY MASK BY 4
00705       147000              ADD     2,1             ;ADD MASK TO #
00706       030153              LDA     2,CON29         ;GET A CONSTANT = 033031  OCTAL
00707       147000              ADD     2,1             ;ADD CONSTANT TO # TO MAKE NEW RANDOM #
00710       046051              STA     1,@PLOTA        ;STORE THE RANDOM # AT PLOT A
00711       101212              MOVR    0,0,SZC   #     ;IS THIS THE FIRST PASS
00712       000411              JMP     .+11            ;NO-CHECK RANDOM # STORED AWAY
00713       030051              LDA     2,PLOTA         ;YES-GET STARTING ADDRESS
00714       172400              SUB     3,2             ;MAKE LOW CORE POINTER
00715       045000              STA     1,0,2           ;STORE RANDOM # IN LOW CORE
00716       030150              LDA     2,CON26         ;GET LAST LOC TO BE TESTED
00717       173000              ADD     3,2             ;SUB LOC POINTER FROM LAST LOC
00720       151400              INC     2,2             ;MAKE HIGH CORE POINTER
00721       124400              NEG     1,1             ;TAKE 2'S COMPLEMENT OF RANDOM #
00722       045000              STA     1,0,2           ;STORE IT IN HIGH CORE
00723       030051              LDA     2,PLOTA         ;GET STARTING ADDRSS
00724       172400              SUB     3,2             ;MAKE LOW CORE POINTER
00725       025000              LDA     1,0,2           ;GET RANDOM # FROM LOW CORE
00726       030150              LDA     2,CON26         ;GET LAST LOC ADDRESS TO BE TESTED
00727       173000              ADD     3,2             ;SUB LOC POINTER FROM LAST LOC
00730       151400              INC     2,2             ;MAKE HIGH CORE POINTER
00731       031000              LDA     2,0,2           ;GET 2'S COMPLEMENT OF RANDOM # FROM HIGH CORE
00732       133014              ADD     1,2,SZR   #     ;ADD THEM - IS RESULT = 0 ?
00733       000400              JMP     .               ;NO-STOP PROGRAM COUNTER
00734       064474              DIA     1,74            ;GET DETECTOR A
00735       125100              MOVL    1,1             ;ROTATE DATA LEFT
00736       125100              MOVL    1,1             ;ROTATE DATA LEFT
00737       125102              MOVL    1,1,SZC         ;ROTATE DATA LEFT-HAS A SCAN STARTED ?
00740       002204              JMP     @.SCN1          ;YES-TAKE IN DATA
00741       064464              DIA     1,64            ;NO-GET DETECTOR B
00742       125100              MOVL    1,1             ;ROTATE LEFT
00743       125100              MOVL    1,1             ;ROTATE LEFT
00744       125102              MOVL    1,1,SZC         ;ROTATE DATA LEFT-HAS A NEW SCAN STARTED ?
```

APPENDIX —Continued

| STATEMENT NO. IN OCTAL | MACHINE LANGUAGE | INPUT CARD | | | |
|---|---|---|---|---|---|
| 00745 | 002204 | | JMP | @.SCN1 | ;YES-TAKE IN DATA |
| 00746 | 175405 | | INC | 3,3,SNR | ;DECREMENT LOC COUNTER - IS IT 0 (ALL LOC DONE)? |
| 00747 | 000406 | | JMP | .+6 | ;YES-INC TEST CTR & CHECK FOR SECOND PASS |
| 00750 | 024163 | | LDA | 1,MSK07 | ;NO - GET DEADMAN MASK |
| 00751 | 065052 | | DOA | 1,S2 | ;OUTPUT S1 |
| 00752 | 124000 | | COM | 1,1 | ;COMPLEMENT THE DEADMAN MASK |
| 00753 | 065026 | | DOA | 1,25 | ;OUTPUT S2 |
| 00754 | 000723 | | JMP | MEMT7+3 | ;DO NEXT LOC |
| 00755 | 101400 | | INC | 0,0 | ;INCREMENT TEST/PASS COUNTER |
| 00756 | 101212 | | MOVR | 0,0,SZC # | ;WAS THIS PASS 0 ? |
| 00757 | 000715 | | JMP | MEMT7 | ;YES-DO PASS 1 |
| 00760 | 060351 | | NIOP | S1 | ;SYNC PULSE FOR SCOPE |
| 00761 | 002235 | | JMP | @.CHJP | ;NO-START DIAGNOSTIC OVER AGAIN |
| 00762 | 000406 | | JMP | .+6 | ;JMP OVER UNUSED LOCATIONS |
| | 000005 | | .BLK | 5 | ;FIVE UNUSED LOC FOR QUICK FIX !!!!!!!!!!!!!!!!! |
| | | ; | | | |
| | | | | | ;SUBROUTINE SCAN - LEVEL 4 |
| | | ; | | | |
| 01337 | 056250 | SCAN: | STA | 3,@SAVE4 | ;SAVE THE RETURN ADDRESS |
| 01340 | 006207 | | JSR | @.DEDM | ;RESET DEADMAN |
| 01341 | 024155 | | LDA | 1,MSK01 | ;GET SCAN BIT MASK (BIT 13) |
| 01342 | 070474 | | DIA | 2,74 | ;GET DETECTOR A |
| 01343 | 133434 | | ANDZ | 1,2,SZR # | ;DETECTOR A SCANNING ? |
| 01344 | 002251 | | JMP | @RETN4 | ;YES-RETURN TO PC |
| 01345 | 070464 | | DIA | 2,64 | ;NO - GET DETECTOR B |
| 01346 | 133434 | | ANDZ | 1,2,SZR # | ;DETECTOR B SCANNING ? |
| 01347 | 002251 | | JMP | @RETN4 | ;YES-RETURN TO PC |
| 01350 | 012250 | | ISZ | @SAVE4 | ;INCREMENT RETURN ADDRESS |
| 01351 | 002251 | | JMP | @RETN4 | ;NO-RETURN TO PC+1 |
| 01564 | 024163 | DEDMN: | LDA | 1,MSK07 | ;GET DEADMAN MASK |
| 01565 | 065052 | | DOA | 1,52 | ;OUTPUT S1 |
| 01566 | 124000 | | COM | 1,1 | ;COMPLEMENT DEADMAN MASK |
| 01567 | 065025 | | DOA | 1,25 | ;OUTPUT S2 |
| 01570 | 001400 | | JMP | 0,3 | ;RETURN TO PROGRAM |

We claim as our invention:

1. A fault indicator for continually monitoring the operation of electrical apparatus comprising:
- means for supplying a predetermined coded output signal in a preselected sequence periodically when the apparatus monitored is functioning properly;
- means responsive to the proper presentation of the coded output in the preselected sequence to provide a decoded output signal;
- a timer operable to provide an output for a predetermined time interval and responsive to the decoded output to reinitiate the time interval;
- means for providing a fault output; and
- means responsive to the timer output to prevent the fault output means from providing an output during the running of the predetermined time interval.

2. The fault indicator of claim 1 wherein the supplying means comprises a transmission bus for communicating information in digital form and further including means for controlling the information communicated on the bus wherein the control means periodically communicates the coded output along the bus to the decoder means.

3. The fault indicator of claim 2 wherein the transmission but includes address lines and data word lines and wherein the predetermined coded output includes a given address and a given data word.

4. The fault indicator of claim 3 wherein the given address and data word respectively comprises first and second addresses and corresponding first and second data word.

5. The fault indictor of claim 4 wherein the first and second addresses and corresponding first and second data words are provided in the preselected sequence within the coded output.

6. The fault indicator of claim 4 wherein the first and second addresses and the first and second data words are respectively complementary.

7. The fault indicator of claim 6 wherein the first and second addresses and the first and second data words respectively occupy all the corresponding address lines and data words lines on the transmission bus.

8. The fault indicator of claim 1 wherein the interval between coded outputs when the apparatus monitored is functioning properly is less than the predetermined time interval.

9. A method of indicating a malfunction in electrical apparatus having a number of discrete operations comprising the steps of:
- generating a predetermined coded output signal in a preselected sequence periodically upon the proper occurrence of a given number of the discrete operations;
- communicating the coded output to a decoder;
- decoding the coded output;
- providing a decoded output representative of the reception of the coded output in a preselected sequence by the decoder;
- supplying an electrical signal for a predetermined time interval;
- reinitiating the electrical signal for the predetermined time interval in response to the occurrence of the decoded output;
- generating a fault output;
- communicating the fault output as an indication of a malfunction in the apparatus monitored; and
- inhibiting the fault output from being communicated while the electrical signal is being supplied.

10. The method of claim 9 wherein the interval of the period between generation of the coded outputs when the apparatus monitored is functioning properly is less than the predetermined time interval.

11. The method of claim 9 wherein the discrete operations of the apparatus occur in a given sequence and the coded output is generated during preselected discrete operations.

12. The method of claim 9 including the step of testing circuitry within the apparatus wherein the generating step provides the coded output upon the occurrence of a valid test and the interval between the generation of the coded output is less than the predetermined time interval as long as a valid test has occurred.

13. The method of claim 12 including the step of initiating the testing step while the apparatus is connected in an intended application while the apparatus is not functioning in the application.

14. The method of claim 13 wherein the initiating step continuously reinitiates the testing step while the apparatus is not functioning in the application.

* * * * *